Oct. 25, 1966  C. J. BARRETT ETAL  3,281,649
OVEREXCITATION LIMIT CIRCUITS
Filed April 19, 1963  4 Sheets-Sheet 3

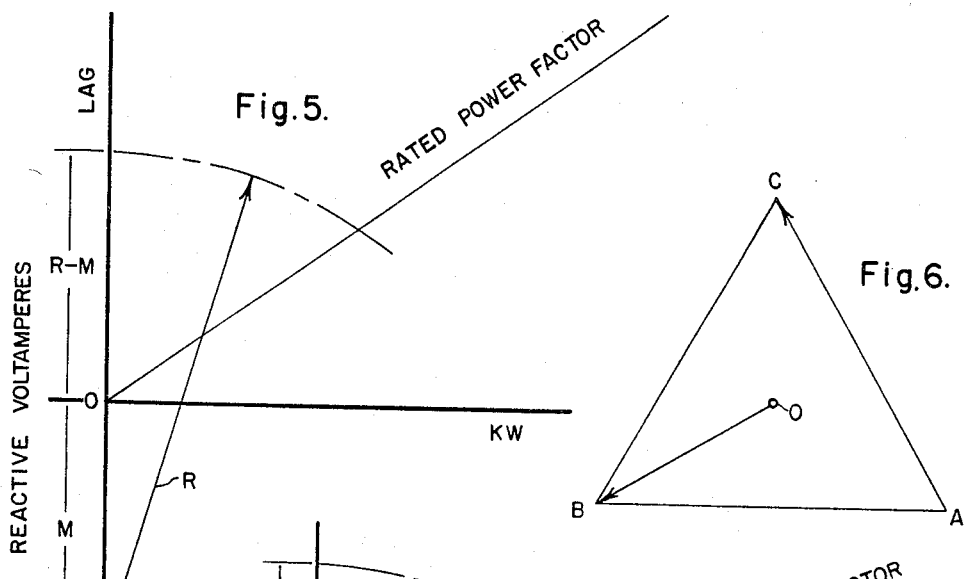
Fig. 5.
Fig. 6.
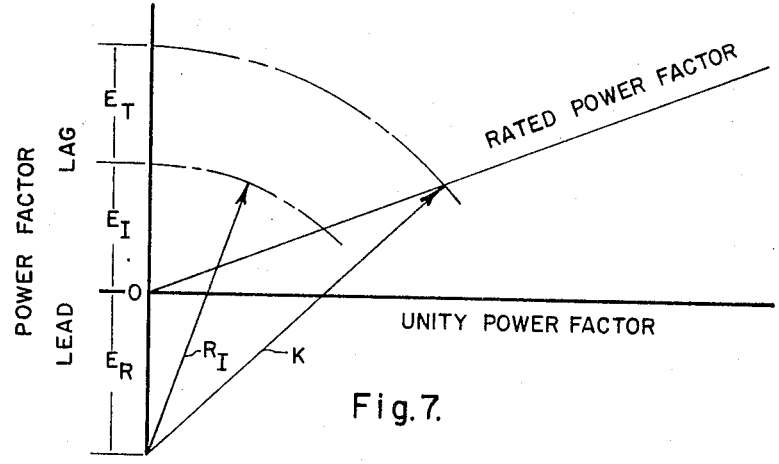
Fig. 7.
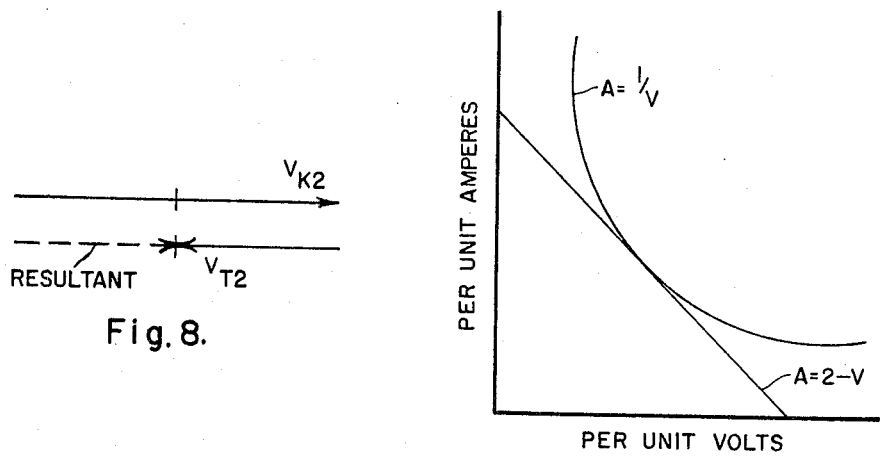
Fig. 8.
Fig. 9.

United States Patent Office 3,281,649
Patented Oct. 25, 1966

3,281,649
OVEREXCITATION LIMIT CIRCUITS
Clarence J. Barrett, Edgewood, and Nikolay Kormanik, Hempfield Township, Westmoreland County, Pa., assignors to Westinghouse Electric Corporation, Pittsburgh, Pa., a corporation of Pennsylvania
Filed Apr. 19, 1963, Ser. No. 274,094
3 Claims. (Cl. 322—25)

This invention relates in general to control apparatus and more particularly to overexcitation limit circuits used in electrical control apparatus, such as regulator systems.

Overexcitation of a dynamoelectric machine causes overheating and consequently may damage the machine if the condition is not detected and corrected. It is, therefore, desirable that the regulator system for the dyamoelectric machine incorporate a circuit for detecting the condition where the machine output exceeds the machine overexcitation capability and produce a signal which may be used to reduce the machine excitation to an allowable magnitude. The overexcitation capability limit of a dynamoelectric machine is a function of the machine kva., and since the machine output voltage may vary a predetermined percentage above and below rated machine voltage, the overexcitation limit cannot accurately be sensed by line or field current alone. The overexcitation limiting circuit must, therefore, respond to machine kva. In other words, for a decrease in machine voltage, the machine current limit must be allowed to increase, and for an increase in machine voltage, the current at which the circuit will produce a signal must be reduced.

It is an object of this invention to provide a new and improved regulator system for a dynamoelectric machine.

Another object of this invention is to provide a new and improved regulator system for a dynamoelectric machine, such as a synchronous generator, which includes provision for preventing overexcitation of the machine.

A further object of this invention is to provide for obtaining a maximum excitation limit for a synchronous generator which is responsive to the generator kva., so as to match the overexcitation capability of a generator, which also varies with the generator kva.

A still further object of the invention is to provide a new and improved overexcitation limit circuit for a generator by means of apparatus comprising static components.

Briefly, the present invention accomplishes the above cited objects by matching the overexcitation capability characteristic of the generator, which may be expressed graphically as an arc of a circle, by utilizing a current-potential vector relationship taken from the generator output terminals whereby the current is in phase with the potential at zero power factor. The overexcitation capability limit can then be detected by comparing the magnitude of the signal produced by the current-potential additive circuit with a reference signal, with the reference signal being used to control the machine excitation except when the signal produced by the current-potential circuit exceeds the reference signal.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIG. 5 is a diagram illustrating a typical overexcitation capability curve of a sychronous generator;

FIG. 6 is a vector diagram illustrating a phase relationship between the current and voltage of a generator that may be used by the different embodiments of the invention;

FIG. 7 is a diagram illustrating the various voltage vectors of the embodiment of the invention shown in FIG. 3.

FIG. 8 is a vector diagram illustrating the operation of the embodiment of the invention shown in FIG. 4; and FIG. 9 is a graphic illustration showing the accuracy of the embodiment of the invention shown in FIG. 4.

Figure 1A:
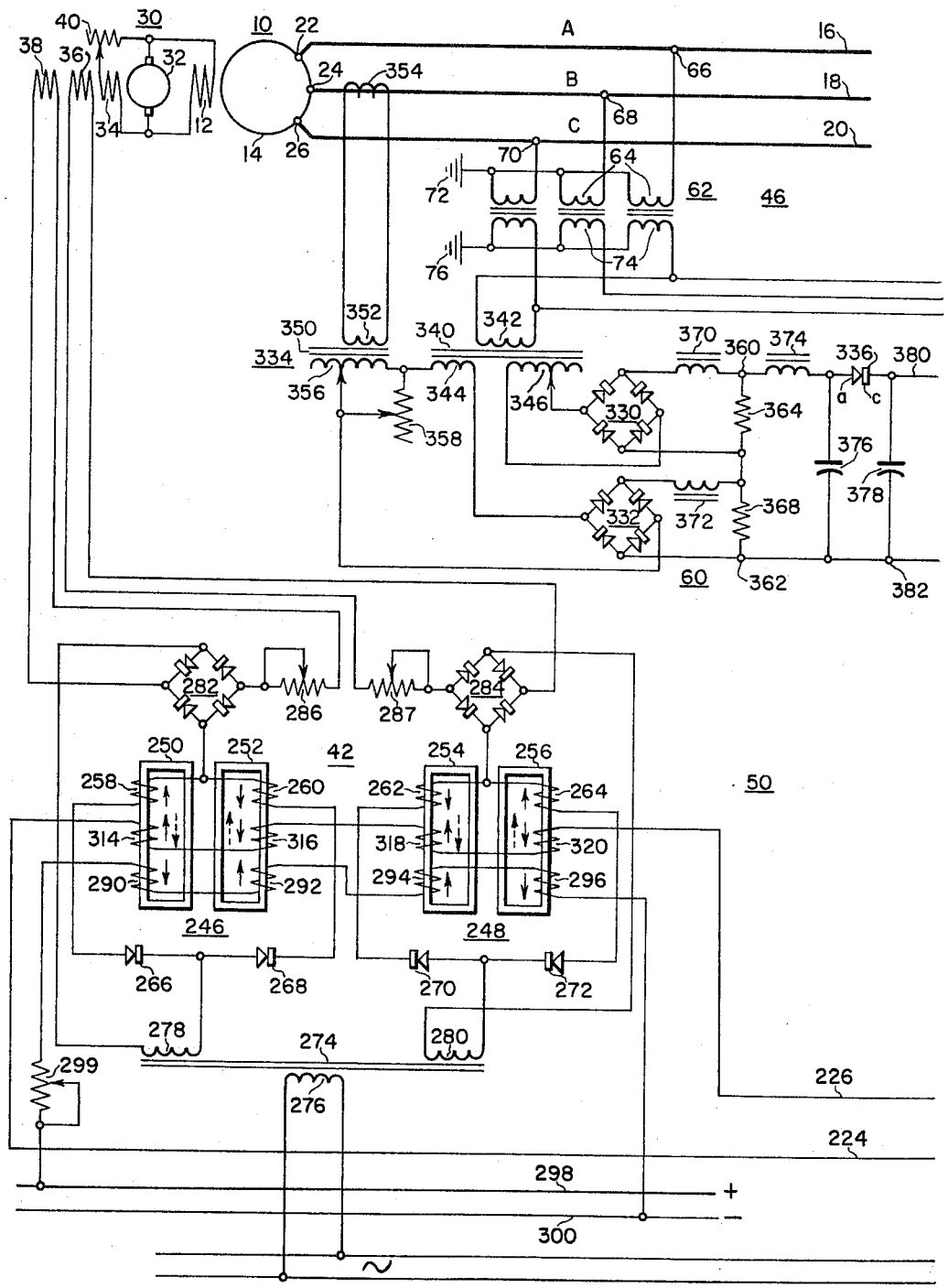
FIGURES 1A and 1B are schematic diagrams illustrating an embodiment of the invention incorporated into a regulator system.
Figure 1B:
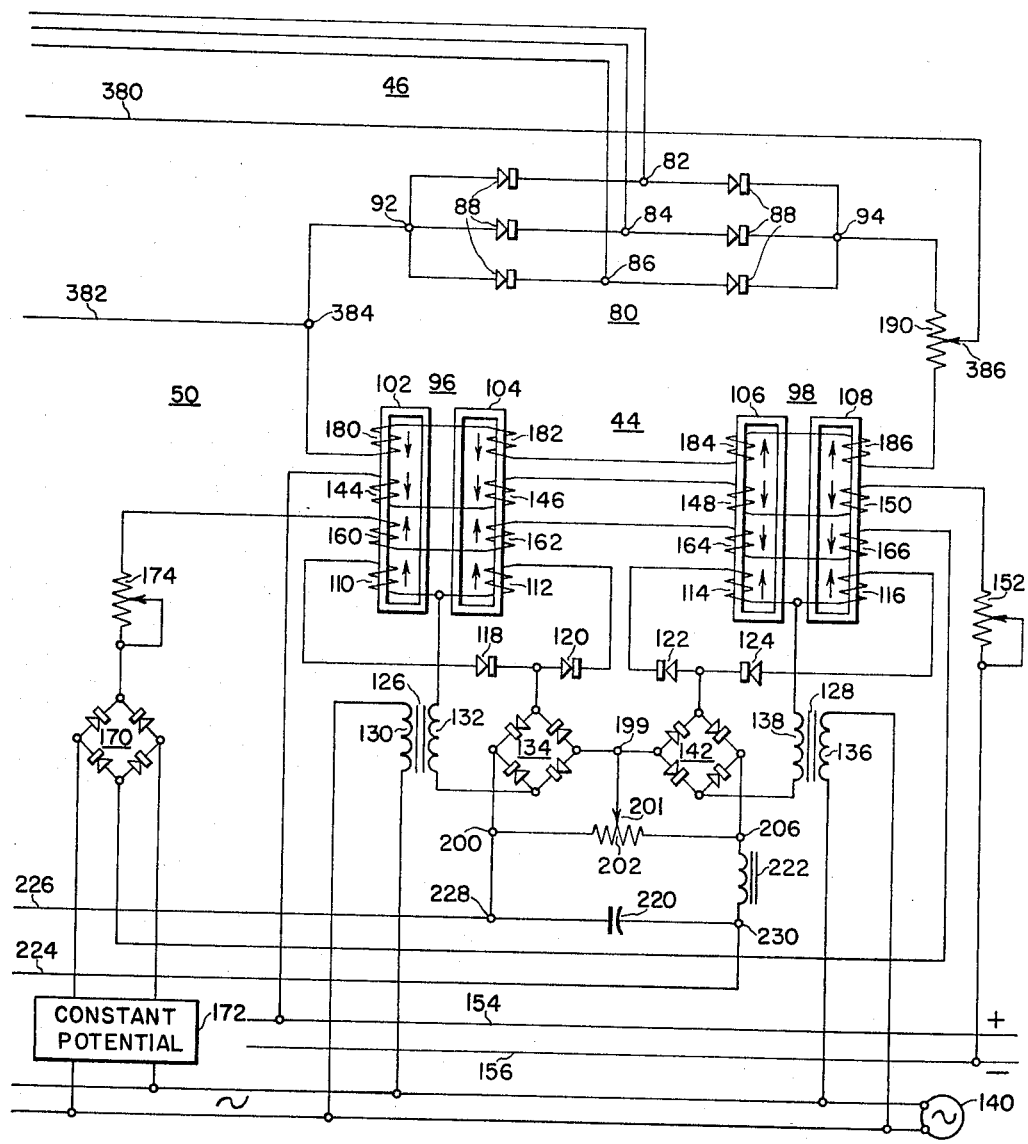

Referring now to the drawings, and FIGS. 1A and 1B in particular, there is illustrated a three-phase alternating current generator 10 having an excitation field winding 12 and an armature 14 disposed to supply electrical energy to line conductors 16, 18 and 20 through output terminals 22, 24 and 26, respectively. In order to obtain an excitation voltage across the field winding 12 of a relatively large magnitude, an exciter 30 is provided. The generator 10 and exciter 30 may both be driven by a suitable prime mover (not shown). In this instance, the exciter 30 comprises an armature 32, which supplies excitation current to the field winding 12 of the generator 10, a self-exciting winding 34 which is connected in shunt with the armature 32, and buck and boost field windings 36 and 38 respectively, whose function will be explained in greater detail hereinafter. In order to provide means for manually changing the self-excitation of the exciter 30, a rheostat or adjustable resistor 40 is connected in series circuit relation with the self-excitation field winding 34 and the armature 32.

In order to maintain the output voltage of the generator 10 substantially constant, a regulator loop 50, comprising push-pull magnetic amplifiers 42 and 44, and sensing circuit 46 is interconnected between the output of the generator 10 and the buck and boost field windings 36 and 38 of the exciter 30.

An overexcitation limiter circuit 60 is connected to the output of the generator 10 and cooperates with the push-pull magnetic amplifiers 42 and 44 of the regulating loop 50, to prevent the generator 10 from operating in an overexcited condition. For purposes of clarity, the components and operation of the regulating loop 50 and how it maintains the voltage output of generator 10 at substantially a constant magnitude will be described before describing the components and operation of the overexcitation limiter circuit 60.

In order to obtain voltage intelligence, or a signal proportional to the output voltage of the generator 10, sensing circuit 46 comprising potential transformer 62 and bridge rectifier circuit 80 is provided. More specifically, potential transformer 62, which in this instance is illustrated as being a three-phase transformer, has one side of each of the primary windings 64 connected to the generator line conductors 16, 18 and 20 at points 66, 68 and 70, respectively. The remaining sides of primary winding 64 are grounded at point 72. One side of each of the secondary windings 74 is connected to the three-phase bridge rectifier circuit 80 at points 82, 84 and 86, and the remaining sides of windings 74 are grounded at point 76.

Three phase bridge rectifier circuit 80, which may be comprised of a plurality of rectifier diodes 88, changes the alternating signal applied at points 82, 84 and 86 to a direct current signal at points 92 and 94. This direct current signal is proportional to the output voltage of the generator 10 and is applied to the magnetic amplifier 44 to be compared with a reference signal as will hereinafter be explained.

As illustrated, push-pull magnetic amplifier 44 is of conventional or standard construction and comprises two main sections 96 and 98. Section 96, or "boost" section, comprises two magnetic core members 102 and 104, and section 98, or "buck" section, comprises two magnetic core members 106 and 108. In this instance, load windings 110, 112, 114 and 116 are disposed in inductive relationship with the magnetic core members 102, 104, 106 and 108, respectively. As is customary, self-saturation for the magnetic amplifier 44 is obtained by connecting in a series circuit relationship with the load windings 110, 112, 114 and 116 self-saturating rectifiers 118, 120, 122 and 124, respectively.

In order to form a doubler circuit of section 96, the series circuit including the load winding 110 and the self-saturating rectifier 118 is connected in parallel circuit relation with the series circuit including the load winding 112 and the self-saturating rectifier 120. In like manner, in order to form a doubler circuit of the section 98, the series circuit including the load winding 114 and the self-saturating rectifier 122 is connected in parallel circuit relation with the series circuit including the load winding 116 and the self-saturating rectifier 124.

Electrical energy from the load windings 110, 112, 114 and 116 of the magnetic amplifier 44 is received from transformers 126 and 128. Although two transformers 126 and 128, are illustrated, in practice it may be desirable to utilize a single transformer having a single primary winding and two secondary windings. As illustrated, transformer 126 includes primary winding 130 connected to a source of alternating potential 140, which may be provided by the output of generator 10 or some independent source, and secondary winding 132. A full-wave dry-type load rectifier 134 is interconnected with the hereinbefore described parallel circuit of section 96, and with the secondary winding 132 of transformer 126 in order to produce a direct current output for section 96. Transformer 128 includes primary winding 136 connected to the source of alternating potential 140 and the secondary winding 138. A full-wave dry-type load rectifier 142 is interconnected with the hereinbefore described parallel circuit of the section 98 and with the secondary winding 138 of the transformer 128 in order to produce a direct-current output for section 98.

For the purpose of biasing the magnetic amplifier 44 by a predetermined amount, the bias windings 144, 146, 148 and 150 are disposed in inductive relationship with the magnetic core members 102, 104, 106 and 108, respectively. In particular, the bias windings 144, 146, 148 and 150 are connected in series circuit relation with one another, the series circuit being connected through an adjusting rheostat 152 to the conductors 154 and 156, which have applied thereto a substantially constant direct-current voltage. In operation, the current flow through bias windings 144 and 146, 148 and 150 produces a magnetomotive force or ampere-turns with respect to their magnetic core members 102 and 104, 106 and 108 that opposes the magnetomotive force produced by the current flow through the load windings 110 and 112, 114 and 116, respectively.

In order to obtain a reference point or signal to compare with the sensing signal from sensing circuit 46, reference windings 160, 162, 164 and 166 are disposed in inductive relationship with the magnetic core members 102, 104, 106 and 108, respectively. The reference windings 160 and 162 are so disposed on their respective magnetic core members 102 and 104 that the current flow therethrough produces a magnetomotive force that adds to the magnetomotive force produced by the current flow through the load windings 110 and 112. On the other hand, reference windings 164 and 166 are so disposed on their magnetic core members 106 and 108 that current flow therethrough produces a magnetomotive force that opposes the magnetomotive force produced by the current flow through load windings 114 and 116. As illustrated, the reference windings 160, 162, 164 and 166 are connected in a series circuit relation with one another, the series circuit being connected to the output terminals of a full-wave dry-type rectifier 170. In order that the current flow through the reference windings 160, 162, 164 and 166 remain substantially constant, the input terminals of the rectifier 170 are connected to a constant potential device 172 which produces a substantially constant alternating current irrespective of the magnitude of the output voltage of the alternating potential source 140. Rheostat or adjustable resistor 174 allows manual control over the magnitude of the reference current.

In order to make magnetic amplifier 44 responsive to the control signal from sensing circuit 46 and, as will be hereinafter described, to the signal from excitation limiting circuit 60, control windings 180, 182, 184 and 186 are disposed in inductive relationship with magnetic core members 102, 104, 106 and 108, respectively. Control windings 180, 182, 184 and 186 are connected in series circuit relation with one another, the series circuit being connected through adjustable resistor 190 to the output terminals 92 and 94 of three phase bridge rectifier 80. The control windings 180 and 182 of "boost" section 96 are so disposed on their respective magnetic core members 102 and 104 that when current flows therethrough a magnetomotive force is produced in their respective core members that opposes the magnetomotive force produced by the flow of current through load windings 110 and 112 disposed on magnetic core members 102 and 104. The control windings 184 and 186 of "buck" section 98 are so disposed on their respective magnetic core members 106 and 108 that when current flows therethrough a magnetomotive force is produced in their respective magnetic core members that aids or adds to the magnetomotive force produced by the flow of current through load windings 114 and 116 disposed on magnetic core members 106 and 108.

The output of "boost" section 96 of magnetic amplifier 44 appears across the output terminals of full-wave dry-type rectifier 134, and from terminal 200 to the movable member 201 of adjustable resistor 202. The output of the "buck" section 98 of magnetic amplifier 44 appears across the output terminals of full-wave dry-type rectifier 142, and from terminal 206 to the movable member 201 of adjustable resistor 202.

It should be noted that the direct current output signals of the "boost" section 96 and the "buck" section 98 have their negative outputs connected common at terminal 199 and the movable contact member 201 of adjustable resistor 202. Therefore, when the output signal from the "boost" section 96 equals the output signal from the "buck" section 98, there will be no potential difference between the output terminals 200 and 206 of the magnetic amplifier 44. More specifically, with no current flowing through control windings 180, 182, 184 and 186, bias windings 144, 146, 148 and 150, or reference windings 160, 162, 164 and 166, the output of section 96 appearing across terminals 200 and 199 will be a maximum and will be equal to the output of section 98 appearing across terminals 199 and 206, which will also be a maximum. The output of sections 96 and 98 are at maximum magnitude due to complete saturation of magnetic cores 102, 104, 106 and 108, as a result of the self-saturating rectifiers within the load winding circuit. By applying a suitable value of direct current to the bias windings 144, 146, 148 and 150 in the non-saturating direction, or in other words, the magnetomotive force produced due to the current flow through bias windings 144, 146, 148 and 150 opposes the magnetomotive force produced due to the current flow through the load windings 110, 112, 114 and 116, the voltage output of sections 96 and 98 may each be reduced to approximately one-half of the maximum magnitude and the voltage output of sections 96 and 98 will still be equal in magnitude, with a result that there is still no potential difference between output terminals 200 and 206 of magnetic amplifier 44. Further, by application of a constant value of direct current to reference windings 160, 162, 164 and 166 in a saturating direction in reference windings 160 and 162 disposed on magnetic core members 102 and 104, and in a non-saturating direction in reference windings 164 and 166 disposed on magnetic core members 106 and 108, and the application of direct current to sensing or control windings 180, 182, 184 and 186 that produces a magnetomotive force on their respective core members that is equal and opposite to the magnetomotive force produced by the reference windings 160, 162, 164 and 166 in their respective core members, the potential difference across output terminals 200 and 206 will still be zero because the voltage output of section 96 will still be equal to the voltage output of section 98 and will be of opposite polarity as hereinbefore explained, because the negative terminals of the output of sections 96 and 98 are tied together at terminal 199.

Therefore, when the magnetomotive force produced by the sensing ampere-turns or the current flowing through control windings 180, 182, 184 and 186 equals the magnetomotive force produced by the reference ampere-turns or the current flowing through reference windings 160, 162, 164 and 166, there is no output signal from the magnetic amplifier 44 and this signifies that the output voltage of generator 10 is at the desired magnitude. When the output voltage of generator 10 falls below the desired magnitude, the current flow through control windings 180, 182, 184 and 186 will be reduced. When the current flow through windings 180 and 182 of the "boost" section 96 is reduced, the magnetomotive force produced in magnetic core members 180 and 182 is reduced. Since the magnetomotive force produced in magnetic core members 102 and 104 due to the current flowing through reference windings 160 and 162 has remained constant and opposes the magnetomotive force produced by control windings 180 and 182, there is now a net difference in magnetomotive force in a direction aiding the magnetomotive force produced by the current flow through load windings 110 and 112. This magnetomotive force aiding the load magnetomotive force drives the magnetic core members 102 and 104 toward complete saturation, thus increasing the magnitude of the output signal appearing across terminals 199 and 200. Further, the reduction in magnitude of current flow through sensing or control windings 184 and 186, due to the output voltage of generator 10 falling below the desired magnitude, causes a reduction in magnetomotive force produced in magnetic core members 106 and 108 by the current flow through windings 184 and 186. The magnetomotive force produced by reference windings 164 and 166 in magnetic core members 106 and 108, however, has remained constant, and since the magnetomotive force produced in magnetic core members 106 and 108 by sensing windings 184 and 186 opposes the magnetomotive force produced by reference windings 164 and 166, there is a net magnetomotive force difference that opposes the magnetomotive force produced in magnetic core members 106 and 108 by load windings 114 and 116. This net difference opposing magnetomotive force drives magnetic core members 106 and 108 further away from complete saturation, thus reducing the magnitude of the signal produced by section 98 at terminals 199 and 206. Therefore, since the signal from section 96 increased in magnitude across terminals 199 and 200, and since the signal from section 98 decreased in magnitude across terminals 199 and 206, there is a net potential difference existing across the output terminals of magnetic amplifier 44, with terminal 200 being more positive than terminal 206. In summary, when the output voltage of generator 10 falls below the desired regulated magnitude, a difference in potential is produced across the output terminals 200 and 206 of magnetic amplifier 44 whereby terminal 200 is more positive than terminal 206.

On the other hand, when the output voltage of generator 10 exceeds the desired regulated magnitude, the magnitude of current flowing through sensing or control windings 180, 182, 184 and 186 is greater than the magnitude of current flowing through windings 180, 182, 184 and 186 when the output voltage of generator 10 is at its regulated value. Therefore, a magnetomotive force is produced in magnetic core members 102 and 104 of "boost" section 96 that exceeds the magnetomotive force produced in magnetic core members 102 and 104 by the constant reference current flowing through windings 160 and 162. This net difference in magnetomotive force produced by sensing windings 180 and 182 and reference windings 160 and 162 opposes the magnetomotive force produced in magnetic core members 102 and 104 by current flowing through load windings 110 and 112. The magnetic core members 102 and 104 are thus driven away from complete saturation, reducing the magnitude of the signal produced by "boost" section 96 across terminals 199 and 200.

The increase in current flowing through sensing windings 184 and 186 of "buck" section 98 causes a net difference in magnetomotive force produced in magnetic core members 106 and 108 between the magnetomotive force produced by sensing windings 184 and 186 and the magnetomotive force produced by the constant reference current flowing through reference windings 164 and 166. This net difference in magnetomotive force produced in magnetic core members 106 and 108 aids the magnetomotive force produced in magnetic core members 106 and 108 by the current flowing through load windings 114 and 116, thus driving magnetic core members 106 and 108 towards complete saturation, causing the magnitude of the signal produced across terminals 199 and 206 by "buck" section 98 to increase. Since the magnitude of the signal produced across terminals 199 and 200 by "boost" section 96 has decreased and the magnitude of the signal produced across terminals 199 and 200 by "buck" section 98 has increased, there is a net signal produced across output terminals 200 and 206 of magnetic amplifier, with terminal 206 being more positive than terminal 200.

In summation, when the voltage output of generator 10 is at the desired regulated value, the difference in potential at output terminals 200 and 206 of magnetic amplifier 44 is zero. When the output voltage of generator 10 is below the desired regulated value, a difference in potential appears across output terminals 200 and 206 of magnetic amplifier 44, with terminal 200 being more positive than terminal 206. On the other hand, when the output voltage of generator 10 is above the desired regulated value, a difference in potential also appears across output terminals 200 and 206 of magnetic amplifier 44, with terminal 206 being more positive than terminal 200.

The signals from magnetic amplifier 44 may be filtered by capacitor 220 and choke coil 222, which form a wave filter, with choke coil 222 being connected in series circuit relation with, in this instance, conductor 224 and output terminal 206, and capacitor 220 being connected across the output of magnetic amplifier 44 from terminal 228 to terminal 230. Conductors 224 and 226 are connected to terminals 228 and 230, respectively, and are connected to magnetic amplifier 42 as will be hereinafter explained.

As illustrated, the push-pull magnetic amplifier 42 is of standard construction and comprises two main sections 246 and 248. Section 246 comprises two magnetic core members, 250 and 252, and section 248 comprises two magnetic core members, 254 and 256. In this instance, load windings 258, 260, 262 and 264 are disposed in inductive relationship with the magnetic core members 250, 252, 254 and 256, respectively. As is customary, self-saturation for the magnetic amplifier 42 is obtained by connecting in series circuit relationship with the load windings 258, 260, 262 and 264 self-saturating rectifiers 266, 268, 270 and 272, respectively.

In order to form a doubler circuit of the section 246, the series circuit including the load windings 258 and the self-saturating rectifier 266 is connected in parallel circuit relationship with the series circuit including the load winding 260 and the self-saturating rectifier 268. In like manner, in order to form a doubler circuit of the section 248, the series circuit including the load winding 262 and the self-saturating rectifier 270 is connected in parallel circuit relationship with the series circuit including the load winding 264 and the self-saturating rectifier 272.

Energy for the load windings 258, 260, 262 and 264 of the magnetic amplifier 42 is received from a transformer 274 having a primary winding 276, which in this instance is responsive to the output of the alternating potential source 140, and secondary winding sections 278 and 280. As illustrated, a full-wave dry-type load rectifier 282 is interconnected with the hereinbefore described parallel circuit of section 246, and with the secondary winding section 278 of the transformer 274, in order to produce a direct-current output for the section 246. In like manner, a full-wave dry-type load rectifier 284 is interconnected with the hereinbefore described parallel circuit of the section 248, and with the secondary winding section 280 of the transformer 274, in order to obtain a direct-current output for the section 248.

In this instance, the boost field winding 38 of the exciter 30 is responsive to the output of the load rectifier 282, and the buck field winding 36 of the exciter 30 is responsive to the output of the load rectifier 284. In operation, the buck field winding opposes the boost field winding 28. In order to provide means for changing the gain in the regulator loop 50, variable resistors 286 and 287 are connected in series circuit relationship with the boost field winding 38 and with the buck field winding 36, respectively.

For the purpose of biasing each of the sections 246 and 248 of the magnetic amplifier 42 to approximately half of its output, bias windings 290, 292, 294 and 296 are disposed in inductive relationship with the magnetic core members 250, 252, 254 and 256, respectively. In particular, the bias windings 290, 292, 294 and 296 are connected in series circuit relationship with one another, the series circuit being connected to conductors 298 and 300, which have applied thereto a substantially constant direct-current voltage. Adjustable resistor or rheostat 299 provides manual adjustment of the magnitude of the bias current. In operation, the current flow through the bias windings 290, 292, 294 and 296 produces a magnetomotive force with respect to their respective magnetic core members that opposes the magnetomotive force produced by the current flow through the load windings 258, 260, 262 and 264 respectively.

The control windings 314, 316, 318 and 320 are so disposed on their respective magnetic core members 250, 252, 254 and 256, that when current flows therethrough from winding 314 towards winding 320, a magnetomotive force is produced in magnetic core members 250 and 252 of boost section 246, as illustrated by the dotted arrows, that opposes the magnetomotive force produced by the current flow through the respective load windings 258 and 260. Thus, magnetic core members 250 and 252 are driven further away from complete saturation, thus reducing the output signal from boost section 246. The current flow through windings 318 and 320, on the other hand, produce a magnetomotive force in magnetic core members 254 and 256, as again illustrated by the dotted arrows, that aids the magnetomotive force produced by load windings 262 and 264 in their respective magnetic core members 254 and 256. Magnetic core members 254 and 256 are thus driven towards complete saturation, increasing the current signal of "buck" section 248 of magnetic amplifier 42.

When the output voltage of generator 10 is above the desired regulated value, terminal 206 is more positive than terminal 200, and current will flow through control windings 314, 316, 318 and 320 from winding 314 towards winding 320. As we have hereinbefore described, a current flow in this direction decreases the output signal from "boost" section 246 of magnetic amplifier 42 and increases the output signal from section 248 of the push-pull magnetic amplifier 42. Such an action increases the current flow through the buck field winding 36 of the exciter 30 and decreases the current flow through the boost field winding 38, to thereby decrease the output voltage of the exciter 30. A decrease in the output voltage of the exciter 30 decreases the magnitude of the voltage across the field winding 12 of the generator 10, to thereby return the output voltage of the generator 10 to its regulated value.

When the output voltage of generator 10 is below the desired regulated value, terminal 200 of magnetic amplifier 44 is more positive than terminal 206. Thus, the current flow through the control windings 314, 316, 318 and 320 of magnetic amplifier 42 is from winding 320 towards winding 314. The magnetomotive force produced by this current flowing through windings 314 and 316 of boost section 246 produces a magnetomotive force in magnetic core members 250 and 252, as illustrated by the solid arrows, that aids the magnetomotive force produced by the load current flowing through windings 258 and 260, thus driving the magnetic core members 250 and 252 towards complete saturation and increasing the output signal from boost section 246. On the other hand, the current flowing through windings 318 and 320 in a direction from winding 320 towards winding 314 produces a magnetomotive force in magnetic core members 254 and 256 that opposes the magnetomotive force produced in magnetic core members 254 and 256 by current flowing through load windings 262 and 264, thus driving said core members further away from complete saturation and decreasing the output signal from the "buck" section 248. This unbalance of push-pull magnetic amplifier 42, with the current from the boost section 246 increasing and the output current of the buck section 248 decreasing, causes the magnitude of the current flow through boost field winding 38 of the exciter 30 to increase, and decreases the magnitude of the current flow through the buck field winding 36. This, in turn, increases the magnitude of the output voltage of the exciter 30 as well as the magnitude of the voltage across field winding 12 of the generator 10, to thereby return the magnitude of the output voltage of the generator 10 to its regulated value.

The overexcitation limiting circuit 60 will now be described. In general, the overexcitation limiting circuit 60 comprises two full-wave dry-type rectifiers 330 and 332, each having input and output terminals, an impedance circuit 334 connected in circuit relation with the electric circuit comprising line conductors 16, 18 and 20, for obtaining signals proportional to line voltage and line current of the generator 10, and a unidirectional rectifier 336.

More specifically, the impedance circuit 334 comprises a potential transformer 340, having primary winding 342 and secondary windings 344 and 346, connected to secondary winding 74 of potential transformer 62, so as to be responsive to the voltage of one of the phases of the three phase electrical circuit, which includes the conductors 16, 18 and 20; and, a current ransformer 350 having a primary winding 352 connected to current transformer 354, so as to be responsive to the current flowing in one of the phases of the electric circuit which includes conductors 16, 18 and 20, and a secondary winding 356 which has an adjustable resistor 358 connected across its output conductors.

In order to apply a voltage to the input terminals of rectifier 330 that is proportional to the output voltage of the generator 10, secondary winding 346 of potential transformer 340 is connected to the input terminals of rectifier 330.

In order to apply a voltage to the input terminals of rectifier 332 that is proportional to the vector sum of the voltages across adjustable resistor 358 and the secondary winding 344 of potential transformer 350, the adjustable resistor 358 and the secondary winding 344 are connected in series circuit relation with one another, the series circuit being connected to the input terminals of rectifier 332.

As illustrated, the voltage produced by rectifier 330 across the load resistor 364 of rectifier 330 adds to the voltage produced by rectifier 332 across the load resistor 368 of rectifier 332, so that the voltage appearing at terminals 360 and 362 is equal to the sum of the voltages produced by rectifiers 330 and 332 across their respective load resistors. For reasons that will hereinafter be explained, the voltage developed by winding 346 of potential transformer 340 and rectified by dry-type rectifier 330 may also be substracted from the voltage produced by dry-type rectifier 332 by reversing the output connections of rectifier 330. Or, in certain instances, it is not necessary to have winding 346 of potential transformer connected into this circuit.

In order to smooth the output signals from rectifiers 330 and 332, filter inductors 370 and 372 may be connected between an output terminal of said rectifiers and a terminal of the load resistors 364 and 368. Inductor 374 and capacitors 376 and 378 may be used for further filtering of the output voltage waveform from terminals 360 and 362. More specifically, filter inductor 374 may be connected between terminal 360 and blocking rectifier 336, and capacitors 376 and 378 may be connected between conductors 380 and 382, one on each side of blocking rectifier 336.

The output conductors 380 and 382 from overexcitation limiting circuit 60 are connected in circuit relation with the output of rectifier 80 and the sensing or control windings 180, 182, 184 and 186. More specifically, conductor 382 is connected to the junction 384 between sensing winding 180 and output terminal 92 of rectifier 80, and conductor 380 is connected to the movable arm 386 of adjustable resistor 190, which adjustable resistor is connected between output terminal 94 of rectifier 80 and sensing winding 186.

The function of the overexcitation limiting circuit 60 is to provide a characteristic similar to the over-excitation capability limit of the generator 10, which as pointed out earlier, follows the arc of a circle. The current-potential vector relationship whereby the current is in phase with the voltage at zero power factor or the current leads the voltage by ninety degrees at unity power factor, gives a substantially similar characteristic and is obtained by the overexcitation limiting circuit 60. One such vector relationship may be obtained by utilizing the generator line current from line conductor 18, and the generator potential from line conductors 16 to 20. This phase relationship is illustrated in FIG. 6, where vector A–C indicates the phase angle of the voltage between generator line conductors 16 and 20, and vector O–B indicates the phase angle of the current in line conductor 18. The current circuit comprising the secondary winding 356 of current transformer 350 and resistor 358 represents the volt-ampere output of the generator 10. This quantity varies in both phase and magnitude and may be represented mathematically by $X+jY$, where X is the watt component and Y is the reactive component. The potential circuit of transformer 340, comprising secondary winding 344, is used to represent the reactive component of the machine capability arc which is designated by the letter M. An equation may now be written expressing the vector sum of the circuit as $R=X+j(Y+M)$. This is the equation of a circle with a radius R and a center at O–M. See FIG. 5. The overexcitation capability limit may then be detected by comparing the resultant of the current-voltage additive circuit, comprising secondary winding 356 of current transformer 350 and secondary winding 344 of potential transformer 340, with a reference quantity. This is accomplished by rectifying the output of the current-voltage additive circuit in rectifier 332 and comparing the resulting signal with the sensing voltage produced by rectifier 80 at its output terminals 92 and 94.

Winding 346 of potential transformer 340 is tapped to provide a range of voltages which may be rectified in rectifier 330 and either added to or subtracted from the overexcitation limiting signal from rectifier 332, to provide a range of limiting signal magnitudes to allow the overexcitation limiting circuit to be standardized and used with a wide range of generator ratings. Where the voltage vector M is substantially equal to one-half of vector R, as shown in FIG. 5, it is not necessary for secondary winding 346 of potential transformer 340 to be connected into the circuit as a change in generator voltage is counteracted by a substantially equal but opposite change in generator current, therefore closely following the actual overexcitation capability limit of the generator. However, in instances where the voltage vector M does not equal one-half of the vector R, an additional voltage produced by winding 346 of potential transformer 340 may be employed to obtain this relationship. Winding 346 may be tapped, as shown, to obtain a range of voltages and rectifier 330 is connected to add to, or subtract from, the voltage produced by rectifier 332, to obtain the relationship of the vector M being substantially equal to one-half the vector R.

The voltage sensing circuit 46 and the overexcitation limiting circuit 60 are connected in circuit relation, as hereinbefore explained, through blocking rectifier 336, which may be a semiconductor diode having an anode $a$ and a cathode $c$. The rectifier 336 is connected to allow current to flow only from the overexcitation limiting circuit 60 to the sensing circuit 46. In other words, when the output voltage from the overexcitation limiting circuit 60 at output terminals 360 and 362 exceeds the output voltage of the sensing circuit 46 at terminals 92 and 94, current is allowed to flow through the overexcitation limiting circuit 60 to the sensing circuit 46, thus increasing the effective sensing voltage applied to the control windings 180, 182, 184 and 186 of magnetic amplifier 44. However, when the sensing voltage produced by sensing circuit 46 exceeds the voltage produced by the overexcitation limiting circuit 60, rectifier 336 blocks current flow from the sensing circuit 46, thus preventing any sensing current drain. Thus, the limiting condition occurs when the voltage output from the overexcitation limiting circuit 60 exceeds the voltage output from the sensing circuit 46. When the sensing voltage output at terminals 92 and 94 exceeds the overexcitation output voltage at terminals 360 and 362, the operation of the regulating circuit 50 is not affected. However, when the limiting condition has been met, and the overexcitation voltage at terminals 360 and 362 exceeds the sensing voltage at terminals 92 and 94, the effective sensing voltage is increased, causing the current magnitude flowing through control windings 180, 182, 184 and 186 of push-pull magnetic amplified 44 to increase. As hereinbefore described, when the current flow control windings 180, 182, 184 and 186 increases, the magnetomotive force produced in magnetic core members 102 and 104 by windings 180 and 182 exceeds the magnetomotive force produced in magnetic core members 102 and 104 by current flowing through reference windings 160 and 162. This magnetomotive force net difference opposes the magnetomotive force produced in magnetic core members 102 and 104 by current flowing through load windings 110 and 112, driving the magnetic core members 102 and 104 further away from complete saturation, and consequently the output signal of "boost" section 96 appearing between terminals 199 and 200 is decreased. On the other hand, the increased current flowing through control windings 184 and 186 produces a magnetomotive force in magnetic core members 106 and 108 that exceeds the magnetomotive force produced in magnetic core members 106 and 108 by the current flowing through reference windings 164 and 166, producing a net magnetomotive force that aids the magnetomotive force produced in magnetic core members 106 and 108 by current flowing through load windings 114 and 116, thus driving magnetic core members 106 and 108 toward complete saturation and increasing the output signal of buck section 98 appearing across terminals 199 and 206. The potential difference appearing across output terminals 200 and 206 is such that terminal 206 is more positive than terminal 200, thus causing a current to flow through control windings 314, 316, 318 and 320 of push-pull magnetic amplifier 42 in a direction from winding 314 to winding 320. This current flow through windings 314, 316, 318 and 320 unbalances the magnetic amplifier 42, as the boost section 246 is driven further away from saturation, reducing its output signal, and, therefore, reducing the current flowing in boost section winding 38 of exciter 30. The buck section 248 is driven towards complete saturation, increasing its output signal and, therefore, increasing the current flowing in buck excitation winding 34 of exciter 30. This action reduces the output current of armature 32 of exciter 30, thus reducing the excitation current flowing through winding 12 of generator 10 and reducing the output voltage of generator 10 to a magnitude within the excitation capability of the generator 10.

In summary, the overexcitation limiting circuit 60 matches the overexcitation characteristics of the generator 10, taking into account that the maximum excitation limit of a generator is a function of generator kva. The overexcitation limiting circuit does not affect the function of the regulating circuit 50 when the maximum excitation limit has not been exceeded, and when the excitation capability of the generator 10 is exceeded, the circuit functions to introduce a signal into the regulating circuit 50 to reduce the output voltage of the generator 10 to a magnitude within the excitation capability of the generator 10.

Figure 2:
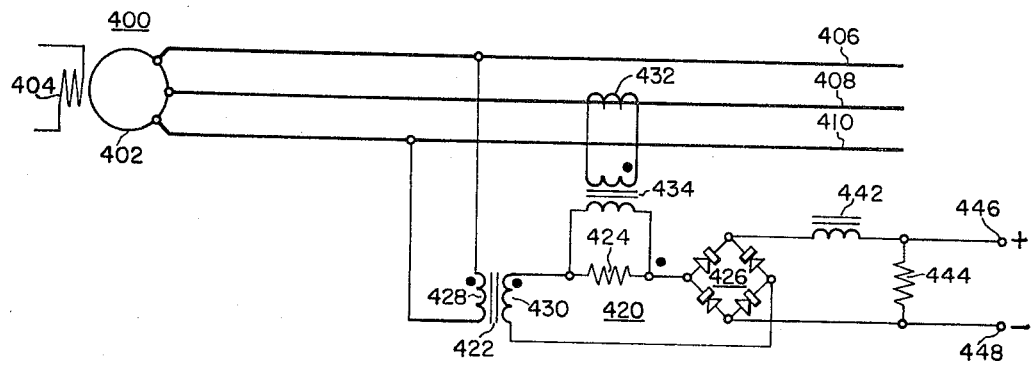
FIG. 2 is a schematic diagram illustrating another embodiment of the invention.

FIG. 2 illustrates a basic overexcitation limiting circuit which functions in the same manner as the overexcitation limiting circuit 60, as shown in FIG. 1, but does not contain the secondary winding 346 which allows the overexcitation limiting circuit 60 of FIG. 1 to be used on a wide range of generator ratings without modification. In other words, the circuit illustrated in FIG. 2 may be used with close accuracy when, as shown in FIG. 5, voltage vector M is substantially equal to one-half the vector R.

More specifically, three-phase generator 400 comprises armature 402 and field winding 404 and is disposed to supply electrical energy to line conductors 406, 408 and 410. Overexcitation limiting circuit 420 comprises potential transformer 422, impedance means 424, and full wave dry-type rectifier 426. Potential transformer 422 includes primary winding 428 connected in circuit relation with, in this instance, line conductors 406 and 410, and secondary winding 430 connected in circuit relation with impedance means or resistor 424 and the input terminals of dry-type rectifier 426. Potential transformer 422 is responsive to the output voltage of generator 10 and develops a voltage across secondary winding 430 proportional to said output voltage.

Current transformers 432 and 434 obtain a signal proportional to the generator line current and a voltage proportional to the generator line current is developed across resistor 424. Because of the phase relationship of the voltage developed across secondary winding 430 of potential transformer 422 and the voltage developed across resistor 424, the vector summation of these voltages produces an overexcitation limiting signal that is similar to the actual overexcitation limiting characteristic of the generator 400. This overexcitation signal is rectified in dry-type rectifier 426, filtered in waveform filter comprising inductor 442 and applied across resistor 444 to output terminals 446 and 448. Output terminals 446 and 448 may be connected into a regulating arrangement as illustrated in FIG. 1, by connecting terminal 446 of FIG. 2 to terminal 360 of FIG. 1 and terminal 448 of FIG. 2 to terminal 362 of FIG. 1. The operation of the circuit would be as hereinbefore described relative to FIG. 1.

Figure 3:
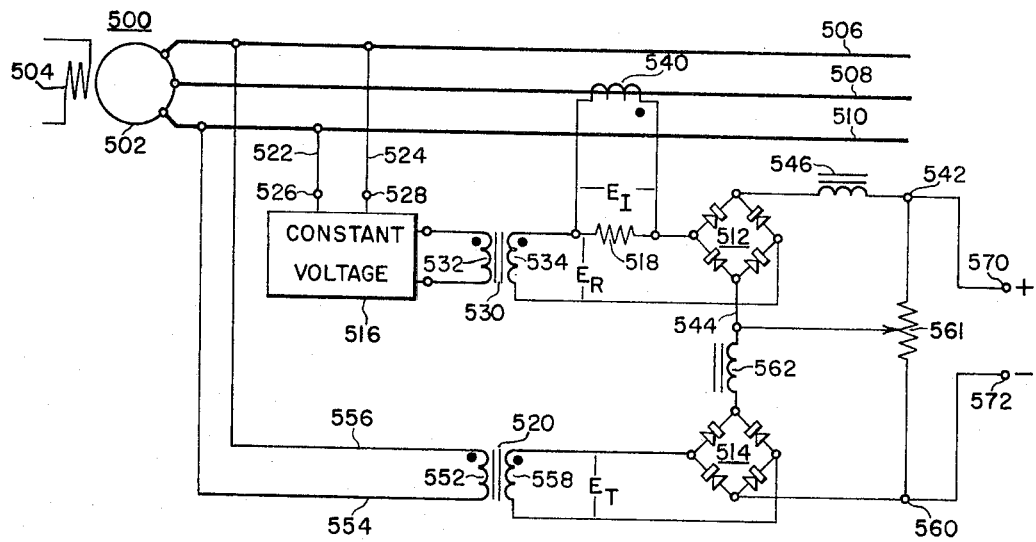
FIG. 3 is a schematic diagram illustrating another embodiment of the invention.

FIG. 3 shows a circuit illustrating another embodiment of the invention. The circuit of FIG. 3 provides an overexcitation limiting signal that is also responsive to generator kva., allowing the line current limit of the machine being regulated to increase when the machine terminal voltage decreases and causing the machine line current limit to decrease when the machine terminal voltage increases.

More specifically, FIG. 3 illustrates a three-phase dynamoelectric machine or synchronous generator 500 having an armature 502, a field winding 504 and disposed to supply electrical energy to line conductors 506, 508 and 510. The overexcitation limiting circuit comprises drytype rectifiers 512 and 514, each having input and output terminals; constant voltage means 516, obtaining a constant voltage in phase with one of the generator voltage phases; impedance means or resistor 518, and potential transformer 520. In order to obtain a constant voltage in phase with a selected phase of the output voltage of the generator 10, conductors 522 and 524 are connected from, in this instance, generator line conductors 506 and 510 to terminals 526 and 528, respectively, of constant voltage means 516. Potential transformer 530, having a primary winding 532 and secondary winding 534, may be used to produce a constant voltage $E_R$ having a suitable magnitude. In order to produce a voltage $E_I$ across resistor 518 proportional to the line current of generator 500, current transformer 540 is disposed in inductor relationship with, in this instance, line conductor 508. A unidirectional voltage proportional to the vector sum of voltages $E_R$ and $E_I$ is produced by dry-type rectifier 512 across terminals 542 and 544. Choke coil 546 may be used to filter the unidirectional output voltage of rectifier 512.

In order to obtain a voltage proportional to the output voltage of generator 500, potential transformer 520 may be used, with primary winding 552 being connected to, in this instance, line conductors 508 and 510 through conductors 554 and 556. Secondary winding 558 of potential transformer 520, which produces a voltage $E_T$, is connected to the input terminals of rectifier 514, and a unidirectional voltage proportional to the output voltage of generator 500 is produced by rectifier 514 across terminals 560 and 544. Choke coil 562 may be used to filter the unidirectional output signal of rectifier 514.

In order that the vector sum of voltages $E_R$ and $E_I$ produce a characteristic similar to the overexcitation limit of generator 500, the particular phases of generator 500 selected to obtain the measure of voltage proportional to generator line current $E_I$ and the constant voltage $E_R$ must be such that the generator line current would be in phase with the voltage at zero power factor. As hereinbefore explained, this relationship of generator currentpotential produces a circle, which is similar to the circle representing the overexcitation capability limit of a synchronous generator. By adding the unidirectional output voltage of rectifier 512 to that of rectifier 514 across an adjusting resistor 561, a unidirectional voltage is produced at output terminals 570 and 572 that is a constant, and which represents the overexcitation capability limit of the generator 500. Although the voltage across terminals 570 and 572 is constant, the circuit shown in FIG. 3 allows the generator line current limit to change with the generator line voltage. This is graphically illustrated in FIG. 7.

By design, the voltage $E_T$ is made to equal the voltage $E_I$ at zero power factor. The center of the circle generated by the summation of voltages $E_I$, $E_T$ and $E_R$ is at $0-E_R$. The summation of voltages $E_I$, $E_T$ and $E_R$ is a constant and is represented by vector K. As the voltage represented by vector $R_I$ changes, $E_T$ changes. Since $E_R$ is constant, when $E_T$ increases, $E_I$ decreases, and when $E_T$ decreases, $E_I$ increases. Since by design $E_T$ is made to equal $E_I$, a per unit change in voltage $E_T$ is accompanied by an equal per unit change in voltage $E_I$ at zero power factor. As the power factor changes, the per unit changes of $E_I$ and $E_T$ differs slightly, but still produces accurate results over the normal power factor operating range of the generator.

Since the output of the circuit shown in FIG. 3 produces a constant unidirectional voltage at its output terminals 570 and 572, representing the overexcitation capability limit of the generator 10, this output voltage at terminals 570 and 572 may be compared with a sensing voltage in an auctioneering type of circuit, as shown in FIG. 1. In other words, the circuit shown in FIG. 3 may be used with the regulating arrangement of FIG. 1 by connecting terminal 570 of FIG. 3 to terminal 360 of FIG. 1 and terminal 572 of FIG. 3 to terminal 362 of FIG. 1. The operation of the circuit would be as hereinbefore described relative to FIG. 1.

Figure 4:
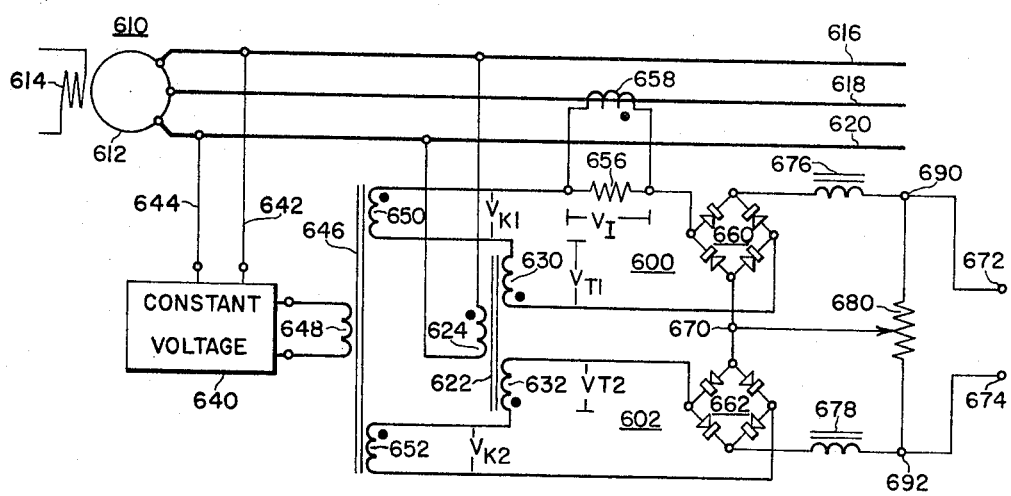
FIG. 4 is a schematic diagram illustrating another embodiment of the invention.

FIG. 4 shows a circuit illustrating still another embodiment of the invention. In general, the overexcitation limiting circuit shown in FIG. 4 comprises sensing circuit 600 and reference circuit 602. The vector summation of the voltages in the sensing circuit is rectified and compared with the rectified vector summation of the voltages in the reference circuit. The limit condition is when the sensing voltage equals the reference voltage.

More specifically, FIG. 4 illustrates a three phase dynamoelectric machine or synchronous generator 610 having an armature 612 and a field winding 614. In this instance, generator 610 is disposed to supply electrical energy to conductors 616, 618 and 620.

In order to obtain a voltage responsive to the output voltage of the generator 610, potential transformer 622 has primary winding 624 connected in circuit relation with, in this instance, generator line conductors 616 and 620. Potential transformer 622 also includes secondary windings 630 and 632, whose function will be explained hereinafter. In order to obtain a constant voltage in phase with one of the phases of generator 610, constant voltage source 640 is connected in circuit relation with, in this instance, generator line conductors 616 and 620 through conductors 642 and 644, respectively. In order to obtain a constant voltage of the proper magnitude for both the sensing circuit 600 and reference circuit 602, potential transformer 646 may be used which has primary winding 648 connected to constant voltage source 640 and secondary windings 650 and 652.

In order to obtain a voltage responsive to the line current of generator 610, resistor 656 is connected across current transformer 658, with current transformer 658, in this instance, being disposed in inductive relationship with generator line conductor 618. In order to rectify the vector summation of sensing and reference voltages, dry-type rectifiers 660 and 662 respectively, are utilized. The negative terminals of rectifiers 660 and 662 are common to terminal 670, therefore, producing at output terminals 672 and 674 a voltage corresponding to the difference between the voltage output of rectifier 660 and the voltage output of rectifier 662. Choke inductors 676 and 678 may be used to filter the output voltage waveform of rectifiers 660 and 662, and adjustable resistor 680 may be used to provide a manual adjustment of the voltage output.

More specifically, the voltages in sensing loop or circuit 600 produced by: secondary winding 630 of potential transformer 622, which we shall call $V_{T1}$, secondary winding 650 of potential transformer 646, which we shall call $V_{K1}$, and the voltage produced across resistor 656, which we shall call $V_I$, are summed vectorially and the vector sum applied to the input terminals of rectifier 660. The unidirectional output voltage of rectifier 660 appears across terminals 690 and 670. By design, voltage $V_{K1}$ equals $-2V_{T1}$.

The voltages in reference loop or circuit 602 produced by: secondary winding 632 of potential transformer 622, which we shall call $V_{T2}$ and secondary winding 652 of potential transformer 646 which we shall call $V_{K2}$, are summed vectorially and the vector sum applied to the input terminals of rectifier 662. The unidirectional output voltage of rectifier 662 appears across terminals 670 and 692. By design, voltage $V_{K2}$ equals $-2V_{T2}$. Since rectifiers 660 and 662 have their negative terminals connected in common, the voltage appearing at output terminals 672 and 674 is the difference between the sensing voltage appearing between terminals 670 and 690, and the reference voltage appearing between terminals 670 and 692.

As hereinbefore stated, the overexcitation capability limit of a dynamoelectric machine or alternating current generator may be expressed by the equation of a circle. The circuit shown in FIG. 4 may be expressed as a circle equation for the limit condition of the voltage appearing across output terminals 672 and 674 being zero, by selecting the phase relationship between the generator line current and the generator output voltage whereby the current is in phase with the voltage at zero percent power factor lagging. This was hereinbefore described relative to FIG. 1. Converting voltage vector $V_{I1}$ into the Cartesian coordinates $V_{IX}$ and $V_{IY}$, the circle equation for the circuit of FIG. 4 may be expressed as follows:

$$V_{IX} + j(V_{K1} + V_{T1} + V_{IY}) = V_{T2} + V_{K2}$$

Rewriting the above equation in polar form with voltage $V_I$ being the dependent variable and the current phase angle $\theta$ being the independent variable, we have:

$$V_I = (V_{K2} + V_{T2})K\theta$$

K, used in the above equation, is a constant. This equation shows that the circuit of FIG. 4, at the limit condition of the voltage at terminals 672 and 674 being equal to zero, will allow the same percent increase of the current at any phase angle for a like percent decrease of the voltage. This is due to the factor $(V_{K2} + V_{T2})$. Since by design, $V_{K2}$ is twice the magnitude of $V_{T2}$ at rated generator output voltage, and one hundred and eighty degrees out of phase, the net result is a factor or resultant that is equal to the magnitude of $V_{T2}$, when the output voltage of generator 10 is at rated voltage, and that increases the same amount that voltage $V_{T2}$ decreases and decreases the same amount that $V_{T2}$ increases. See FIG. 8.

In summary, as long as the reference signal from reference circuit 602, appearing across terminals 692 and 670 is greater than the sensing signal from sensing circuit 600 appearing across terminals 692 and 670, the generator has not met the overexcitation capability limit and output terminal 672 will be less positive than output terminal 692. When the overexcitation capability limit of the generator 610 has been met, the voltage appearing at output terminals 672 and 674 will be equal to zero. As soon as the overexcitation capability limit of the generator 610 is exceeded, the relative polarities of the output terminals 672 and 674 will be such that the output terminal 672 will be less positive than output terminal 674. This reversal of polarity may be used in any number of regulating circuits as a signal to reduce the excitation level of the generator 610. For example, in U.S. Patent 2,862,172 by J. T. Carleton et al. and assigned to the same assignee as the present application, a minimum excitation circuit is disclosed which shunts control current upon a polarity change. The same general type of circuit may be used except control current may be added upon the polarity change, the additional current calling for the regulating circuit to reduce the excitation voltage applied to the generator field winding.

The circuit of FIG. 4 follows the actual generator kva. limit very closely for a generator rated at ±5% voltage range. On a per unit basis for any particular volt-ampere limit (VA) the theoretical limit current is $A=1/V$. For the circuit shown in FIG. 4, the limit current A is equal to: $A=2-V$. The error is equal to the difference between the above two equations, or: Per unit $$\text{error}=1/V-(2.0-V)=(V-1)^2/V$$

Therefore, for a ±5% voltage change, the error is only approximately 0.0026 per unit amperes. For a ±10% voltage change, the error is approximately 0.011 per unit ampere. The error is always such that the limit is below the theoretical limit. This can be seen by observing FIG. 9.

It will, therefore, be apparent that there has been disclosed a new and improved overexcitation limiting circuit that substantially follows the overexcitation capability limit of an alternating current generator. The overexcitation limiting circuit disclosed allows the generator line current limit to change for corresponding changes in generator output voltage, and the circuit utilizes all static components.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. In a regulator system for an alternating current generator having a field winding and disposed to supply electrical energy through output conductors to a three-phase circuit, the combination comprising:
   excitation means connected to the field winding of the alternating current generator, providing field excitation of controllable magnitude;
   regulator means connected to the excitation means, regulating the magnitude of the field excitation provided by said excitation means;
   sensing means connected to the output conductors of the alternating current generator, obtaining a first direct current signal responsive to the output voltage of the alternating current generator;
   potential transformer means having primary and secondary windings;
   the primary winding of said potential transformer means being connected to two of the output conductors, obtaining a measure of the voltage between said two output conductors;
   current transformer means disposed to obtain a measure of the current flowing in that output conductor of the alternating current generator whose current would be in phase with the voltage between the two output conductors connected to said potential transformer means at zero percent power factor;
   resistance means;
   said resistance means being connected across the output of said current transformer means, providing a voltage responsive to the measure of the current obtained by said current transformer means;
   rectifier means having input and output terminals;
   said resistance means and the secondary winding of said potential transformer means being serially connected to the input terminals of said rectifier means, providing a second direct current signal at its output terminals responsive to the vector sum of the voltages provided by said potential transformer means and said resistance means;
   unidirectionally conductive means;
   means connecting like polarities of said first and second direct current signals in common through said unidirectionally conductive means;
   said unidirectionally conductive means being poled to block current flow from said sensing means to said rectifier means when the magnitude of said first direct current signal exceeds the magnitude of said second direct current signal;
   and means connecting the commonly connected first and second direct current signals to said regulator means, thereby connecting said first and second direct current signals in parallel with respect to said regulator means and rendering said regulator means responsive to only the larger of said first and second direct current signals.

2. In a regulator system for an alternating current generator having a field winding and disposed to supply electrical energy through three output conductors to a three-phase circuit, the combination comprising:
   excitation means connected to the field winding of the alternating current generator, providing field excitation of controllable magnitude;
   regulator means connected to the excitation means, regulating the magnitude of the field excitation provided by said excitation means;
   sensing means connected in circuit relation with the output conductors of the alternating current generator, obtaining a first direct current signal responsive to the output voltage of the alternating current generator;
   constant voltage means connected to two of the output conductors of the alternating current generator, providing a constant output voltage in phase with the voltage between said two output conductors;
   current transformer means disposed to obtain a measure of the current flowing in the remaining output conductor of the alternating current generator;
   resistance means;
   said resistance means being connected across the output of said current transformer means, providing a voltage responsive to the measure of the current obtained by said current transformer means;
   potential transformer means connected to provide an output voltage responsive to the output voltage of said alternating current generator;
   first and second rectifier means each having input and output terminals;
   the constant output voltage of said constant voltage means and said resistance means being serially connected across the input terminals of said first rectifier means, providing a voltage at the output terminals of said first rectifier means responsive to the vector sum of the voltages provided by said constant voltage means and said resistance means;
   the output voltage of said potential transformer means being connected to the input terminals of said second rectifier means;
   the output terminals of said first and second rectifier means being connected to add their respective output voltages and provide a second direct current signal;
   unidirectionally conductive means;
   means connecting like polarities of said first and second direct current signals in common through said unidirectionally conductive means;
   said unidirectionally conductive means being poled to block current flow from said sensing means to said first and second rectifier means when the magnitude of said first direct current signal exceeds the magnitude of said second direct current signal;
   and means connecting the commonly connected first and second direct current signals to said regulator means, thereby connecting said first and second direct current signals in parallel with respect to said regulator means, and rendering said regulator means responsive to only the larger of said first and second direct current signals.

3. An electrical circuit providing an output signal responsive to the overexcitation limit capability of a generator disposed to supply electrical energy through three output conductors to a three-phase electrical circuit, comprising:
   first means connected to provide first and second constant voltages in phase with the voltage between two of the output conductors of said three-phase electrical circuit;
   second means connected to provide third and fourth voltages responsive to the magnitude and phase of the voltage between said two output conductors;
   third means connected to provide a fifth voltage responsive to and in phase with the current in the remaining output conductor of said three-phase circuit;
   first and second rectifier means each having input and output terminals;
   said third means, said first and second means, and the input terminals of said first rectifier means being connected to vectorially sum said fifth, first and third voltages, respectively, and apply the vector sum to the input terminals of said first rectifier means;
   said first and second means and the input terminals of said second rectifier means being connected to vectorially sum said second and fourth voltages, respectively, and apply the vector sum to the input terminals of said second rectifier means;
   the output terminals of said first and second rectifier means being connected to place the voltage outputs of said first and second rectifier means in opposition;
   the overexcitation capability limit of the generator being reached when the magnitude of the output voltage of said first rectifier means exceeds the magnitude of the output voltage of said second rectifier means.

References Cited by the Examiner
UNITED STATES PATENTS

| | | | |
|---|---|---|---|
| 2,571,827 | 10/1951 | Bradley | 322—25 |
| 2,602,154 | 7/1952 | Sikorra | 322—20 X |
| 2,672,585 | 3/1954 | Hotson | 322—20 |
| 2,757,332 | 7/1956 | Carleton et al. | 322—25 |
| 2,862,172 | 11/1958 | Carleton et al. | 322—25 |
| 2,883,608 | 4/1959 | Smith | 322—79 X |

MILTON J. HIRSHFIELD, *Primary Examiner.*

J. J. SWARTZ, *Assistant Examiner.*